US006957125B1

(12) United States Patent
Rifkin

(10) Patent No.: US 6,957,125 B1
(45) Date of Patent: Oct. 18, 2005

(54) INTERACTIVE VENDING MACHINE TO VIEW CUSTOMIZED PRODUCTS BEFORE THEY ARE PURCHASED AND INTERNALLY TRACK SALEABLE INVENTORY

(75) Inventor: Andrew Rifkin, Rolling Hills Estates, CA (US)

(73) Assignee: uWink, Inc., Los Angeles, CA (US)

( * ) Notice: Subject to any disclaimer, the term of this patent is extended or adjusted under 35 U.S.C. 154(b) by 0 days.

(21) Appl. No.: 10/837,167

(22) Filed: Apr. 30, 2004

(51) Int. Cl.[7] .............................................. G06F 17/00
(52) U.S. Cl. .......................... 700/232; 700/231; 221/3; 221/6; 221/7; 221/8
(58) Field of Search ............................... 700/231, 232; 221/2, 3, 6–8

(56) References Cited

U.S. PATENT DOCUMENTS

| | | | | |
|---|---|---|---|---|
| 5,615,123 | A | 3/1997 | Davidson | |
| 5,815,147 | A * | 9/1998 | Bogen et al. | 715/835 |
| 5,831,862 | A * | 11/1998 | Hetrick et al. | 700/232 |
| 6,412,658 | B1 | 7/2002 | Bartholomew | |
| 6,470,232 | B2 * | 10/2002 | Parry | 700/233 |
| 6,473,666 | B1 | 10/2002 | Samura | |
| 6,622,064 | B2 | 9/2003 | Bartholomew | |
| 6,834,452 | B2 * | 12/2004 | Martin et al. | 40/544 |
| 2001/0026272 | A1 * | 10/2001 | Feld et al. | 345/419 |
| 2002/0077848 | A1 | 6/2002 | Campbell | |
| 2002/0082745 | A1 | 6/2002 | Wilmott | |
| 2002/0091596 | A1 | 7/2002 | Dudek | |
| 2002/0126132 | A1 * | 9/2002 | Karatassos et al. | 345/586 |
| 2003/0004733 | A1 | 1/2003 | Norsworthy | |
| 2003/0086123 | A1 | 5/2003 | Torrens-Burton | |
| 2003/0101105 | A1 * | 5/2003 | Vock | 705/27 |
| 2003/0132966 | A1 | 7/2003 | Simas | |
| 2003/0140017 | A1 | 7/2003 | Patton | |
| 2004/0039592 | A1 * | 2/2004 | Shima | 705/1 |

OTHER PUBLICATIONS

"Teddy Bear Meets Technology in Breakthrough . . . International Debut", Business Wire, Mar. 17, 2004. www.findarticles.com/p/articles/mi$_{13}$ m0EIN/is_2004_March_17/ai_114311062.*

* cited by examiner

*Primary Examiner*—Khoi H. Tran
(74) *Attorney, Agent, or Firm*—Thomas I. Rozsa; Tony D. Chen

(57) ABSTRACT

An interactive vending machine which enables a consumer to view customized products before they are purchased and thereafter enables the consumer to purchase the customized products. The machine also keeps track of inventory so that if a particular item or accessory is out of stock, it will not be displayed on the screen for purchase.

40 Claims, 4 Drawing Sheets

INTERACTIVE VENDING MACHINE TO VIEW CUSTOMIZED PRODUCTS BEFORE THEY ARE PURCHASED AND INTERNALLY TRACK SALEABLE INVENTORY

BACKGROUND OF THE INVENTION

1. Field of the Invention

The present invention relates to the field of vending machines which enables a consumer to view a customized product before purchase and then purchase the product.

2. Description of the Prior Art

In general, vending machines which enable a consumer to purchase a product specifically designed by the consumer are known. The following twelve patents and published patent applications are relevant to the field of the present invention.

1. U.S. Pat. No. 5,615,123 issued to Davidson on Mar. 25, 1997 for "System For Creating And Producing Custom Card Products" (hereafter the "Davidson Patent");
2. United States Patent Application Publication No. U.S. 2002/0077848 A1 to Campbell on Jun. 20, 2002 for "Method For Creation Of A Customized Book" (hereafter the "Campbell Patent");
3. United States Patent Application Publication No. U.S. 2002/0082745 A1 to Wilmott on Jun. 27, 2002 for "Method And System For Producing Customized Cosmetic And Pharmaceutical Formulations On Demand" (hereafter the "Wilmott Patent");
4. U.S. Pat. No. 6,412,658 B1 issued to Bartholomew on Jul. 2, 2002 for "Point-Of-Sale Body Powder Dispensing System" (hereafter the "'759 Bartholomew Patent");
5. United States Patent Application Publication No. U.S. 2002/0091596 A1 to Dudek on Jul. 11, 2002 for "Process And System For The Customisation Of Consumer Products" (hereafter the "Dudek Patent");
6. U.S. Pat. No. 6,470,232 B2 issued to Parry on Oct. 22, 2002 for "Customized Wrapping Paper Kiosk" (hereafter the "Parry Patent");
7. U.S. Pat. No. 6,473,666 B 1 issued to Samura on Oct. 29, 2002 for "Manufacturing Machine Of Original Design Watch Or Original Design Dial" (hereafter the "Samura Patent");
8. United States Patent Application Publication No. U.S. 2003/0086123 A1 to Torrens-Burton on May 8, 2003 for "Method And Apparatus For Providing Customized Souvenir Images" (hereafter the "Torrens-Burton Patent");
9. United States Patent Application Publication No. U.S. 2003/0004733 A1 to Norsworthy on Jan. 2, 2003 for "Pet Food Kiosk" (hereafter the "Norsworthy Patent");
10. United States Patent Application Publication No. U.S. 2003/0132966 A1 to Simas on Jul. 17, 2003 for "Method And System For Generating A Brick Model" (hereafter the "Simas Patent");
11. United States Patent Application Publication No. U.S. 2003/0140017 A1 to Patton on Jul. 24, 2003 for "System For Customizing And Ordering Personalized Postage Stamps" (hereafter the "Patton Patent");
12. U.S. Pat. No. 6,622,064 B2 issued to Bartholomew on Sep. 16, 2003 for "Nail Polish Selection Method" (hereafter the "'064 Bartholomew Patent");

The Davidson Patent discloses a system for creating and producing custom greeting cards. The display is on a kiosk which can be operated by a touch screen. Upon entry of a selection, e.g. via a transparent touch sensitive plate on the monitor screen, one or more pre-stored groups of card product design formats pertaining to the selected general application are determined, and further inquiries are made via the monitor screen to elicit certain information relating to a specific use or application for the desired card product. There are also selections to have the appropriate text placed upon the card. The patent relates to customizing a greeting card.

The Campbell Patent Application is a published application. The method creates a customized template through software to create a customized book. The book has various text blanks and other image insertion blanks for customizing the book with text, pictures, etc. The text in general and customization is downloadable from a website.

The Wilmott Patent Application relates to a method and system for selecting and producing a customized cosmetic or pharmaceutical formulation. The system can be implemented as an Internet-based system or through a stand-alone kiosk. It uses the user's preferences and profile as well as external factors. The customized formulation can be directed to a manufacturing facility for production. Alternatively, a printout of the formulation can be provided for subsequent point of sale locations such as a cosmetic store or pharmacy.

The '658 Bartholomew Patent is a custom cosmetic powder dispensing system including the steps of providing a body powder dispensing apparatus and operating the body powder dispensing apparatus for dispensing into a container a custom formulation of body powder ingredients at a retail purchase point of sale. The method produces the apparatus for formulating and creating a custom body powder.

The Dudek Patent Application which is a published application is a process for customization of consumer products wherein the ingredients for the products are selected from a vending machine and then constituted and dispensed from the vending machine.

The Parry Patent is a customized wrapping paper kiosk. The user prepares the customized wrapping paper at the kiosk by downloading an image into the kiosk, selecting a wrapping paper background at the kiosk, selecting wrapping paper quality and dimensions at the kiosk, viewing the customized wrapping paper at the kiosk, and printing the customized wrapping paper at the kiosk. This device deals specifically with manufacturing a customized wrapping paper from the kiosk.

The Samura Patent deals with the manufacture of a customized watch dial or customized watch design manufactured from a vending machine. The design information is input through an input apparatus and is transferred to a manufacturing apparatus and utilizes a command for operation of the design pattern to be drawn. The manufacturing apparatus chooses the housing assembly or a dial plate in accordance with the operational command of the design information and prints the designed pattern of the drawing, picture, photograph or character given by the customer on the dial in accordance with the design information. Then, the dial, watch hands and a cover glass are furnished onto the housing assembly in accordance with the selection process. The completed watch is sold by an automatic vending machine or by a sales person. This device deals specifically with the manufacture of the watch or the watch dial.

The Torrens-Burton Patent Application discloses a method and apparatus for providing customized souvenir images. It is a method and system that captures and delivers customized souvenir images to a plurality of attendees at a sporting event, music concert, etc. Individuals wanting to receive a copy of the images provide location information such as their assigned seat number. The present invention uses this information to identify the proper image and deliver it to the customer.

The Norsworthy published Patent Application deals with a pet food kiosk. It deals with a kiosk configured for selling and manufacturing customized food for a pet including a customer interface area, a biological sample analysis and handling area, a base product display area, at least one product additive storage area and an integrated mixing and customer observation area. This is essentially a kiosk for customizing pet foods.

The Simas Patent Application relates to a method for customizing a model brick for use in building structures. The method comprises receiving an electronic representation of an item to be represented by the brick model and processing the electronic representation to generate building instructions to build the brick model.

The Patton published Patent Application is a system for customizing and ordering personalized postage stamps. The system does not deal with a kiosk but is instead a computer program for forwarding the information to a remote ordering station which allows a customized photograph to be printed on a postage stamp.

The '064 Bartholomew Patent is an issued patent and deals with an interactive custom nail polish color and effects dispensing system and method for doing business including both point-of-sale and remote via Internet transaction. The device permits a consumer to customize the nail polish by selecting various formulations and colors of nail polishes from the kiosk and formulating their own color of nail polish.

Finally, the European Patent is an automated service station for cellular phones.

There is a significant need for an improved vending machine to enable a consumer to create, view and purchase customized products.

SUMMARY OF THE INVENTION

The present invention is an interactive vending machine which enables a consumer to view customized products before they are purchased and thereafter enables the consumer to purchase the customized products. The machine also keeps track of inventory so that if a particular item or accessory is out of stock, it will not be displayed on the screen for purchase.

It has been discovered, according to the present invention, that if a vending machine has a series of touch screen locations or buttons which a consumer can press to display a multiplicity of undressed products such as a bear, and other locations where the consumer can select items to put on the bear such as tops, bottoms, and upsell accessories, and if these numerous combinations can be viewed on a screen before a purchase is made, then the consumer is able to make an informed purchase of the specific basic bear with each accessory individually and in combination before a purchase is made so that the consumer will be satisfied with the purchase.

It has also been discovered, according to the present invention, that if the vending machine also includes an adventure mode where the consumer can play one or more games with the selected item bear dressed in any combination of accessories, then the consumer will be encouraged to return to the vending machine to purchase additional items in the future.

It has additionally been discovered, according to the present invention, that if a continuous inventory is maintained with computer instructions not to display an item that is out of stock, consumer problems such as purchasing an out of stock item or desiring an out of stock item will be avoided.

It is therefore an object of the present invention to provide an interactive vending machine which displays on the screen to the consumer the way an item to be purchased will look, including how various accessories will look on the item so the consumer will be encouraged to purchase one or more items and one or more accessories since the consumer can see how the entire ensemble will look before a purchase is made.

It is also an object of the present invention to display an item to purchase in the exact way a consumer will want to purchase it so the consumer has fun during the shopping experience and will want to return in the future to buy more items.

It is also an additional object of the present invention to have a vending machine with a continues inventory monitoring system so that an out of stock item will not be displayed.

It is a further object of the present invention to provide a vending machine with an entertainment feature to encourage the consumer to return in the future to purchase more items.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Figure 1:
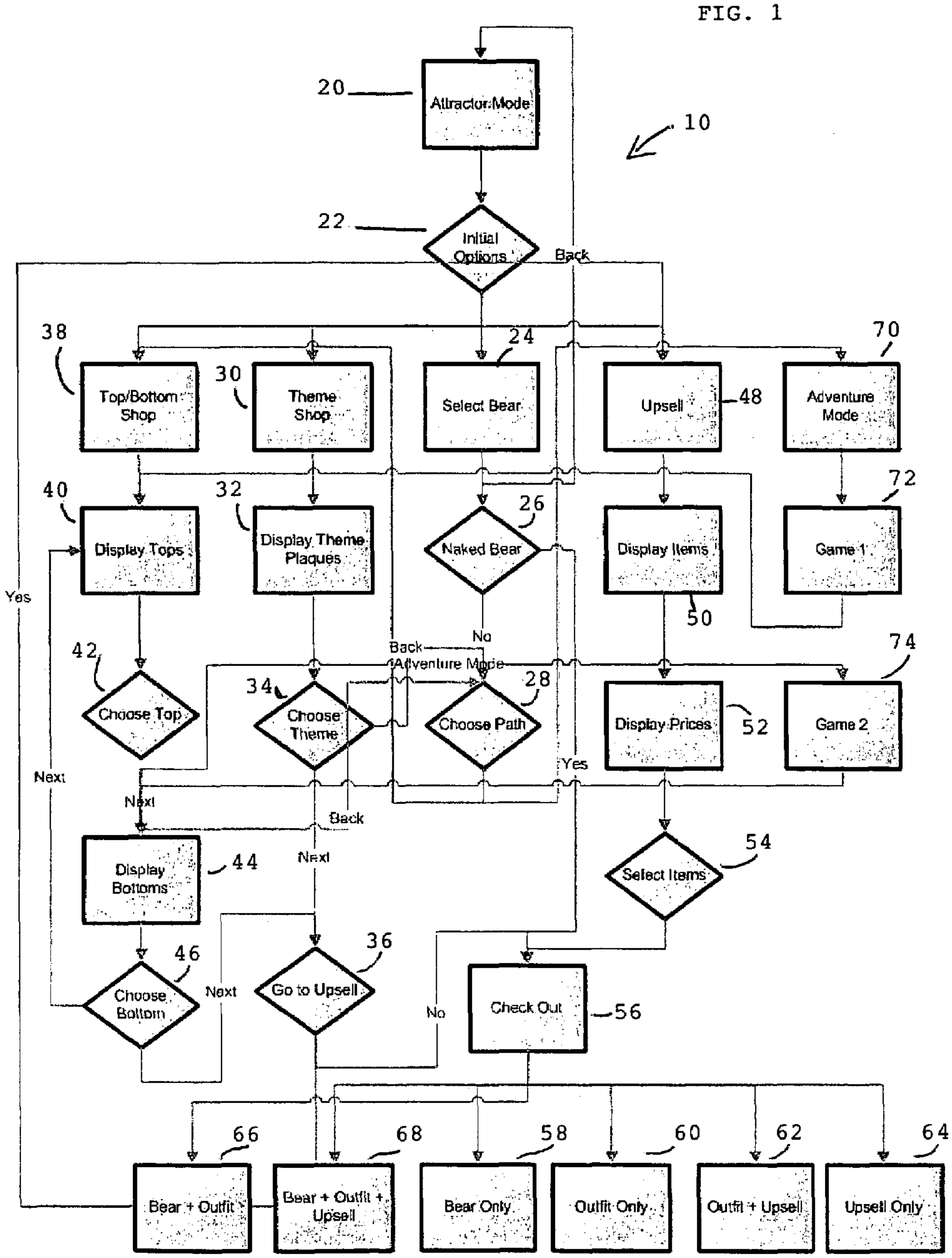
FIG. 1 is a block diagram showing the features of the interactive vending machine used to purchase a customized bear.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is an interactive vending machine which enables a consumer to view customized products before they are purchased and thereafter purchase the customized products. The machine also keeps track of inventory so that if a particular item or accessory is no longer available, it will not be displayed on the screen for purchase.

The invention relates to both software and hardware for creating an interactive touch screen vending machine which enables a user to mix and match various items of a product to see how the product will look before the user purchases the product. By way of example, one interactive vending machine consists of selling a stuffed plush toy bear with various accessories that can be put on the bear such as a hat, a shirt, pants, shoes, necklaces, etc. The touch screen enables a user to interact with the bear itself and pick one or several different shapes of bears and thereafter interact and select numerous various accessories to place on the bear to see how the bear will look with the accessories that the user selects. Through the touch screen method, the bear will be dressed with the hat, the coat, the shoes, the shirt, glasses, etc. Thereafter, the user can then select a specific bear and then specifically buy the specific individual accessories which are individually distributed through various dispensing operations from the vending machine so that the user purchases the final complete product in separate format and can put it together but the user has seen how the bear looks with the various accessories thereon before the user purchases the bear.

Another variation on this is the sale of cosmetics. The screen will have a picture of a face and the screen will enable the consumer to have her face photographed onto the screen or pick any other face from an inventory of faces and then try on various cosmetic products such as eye shadow, eyeliner, lipstick, lip gloss and foundation to see how the person will look with the makeup as selected on the screen so that the person can essentially see a final product of that person's face or any other person's face that the person would like to model herself after (for example, a famous singer or actress), and thereafter select the various cosmetics and try on different cosmetics through the computer touch screen operation so that a visual image of the final completed face with the eyeliner, lipstick, foundation etc. appears. Thereafter, the person can then individually purchase the individual items which the person has selected but now the person has seen how those items will look on her so she has a better feel for how it will ultimately look after she actually applies it.

Another variation on this is various leggo® block alternatives wherein the person can purchase various leggo® blocks after a simulation has appeared on the touchscreen. In addition to being able to select the various leggo® blocks, there will also be an instruction sheet printed out as to how to assemble the leggo® blocks after the various leggo® blocks have been selected.

In addition, part of the innovation of this invention is to have a continuous inventory level monitored within the machine so that if a particular accessory or particular product is out of stock, that will not appear on see the screen and the person will not be able to select that particular product. By way of example, if a specific shirt for a bear is no longer available because it has been sold out of that vending machine, it will not appear on the vending machine for the person to buy. If a particular cosmetic is sold out of that vending machine, it will not appear on the vending machine for the person to be able to purchase.

Referring to FIG. 1, there is illustrated a block diagram showing the steps to select a customized product which in the example illustrated is a customized stuffed plush toy bear which will be dressed in a customized outfit selected by the customer.

The block diagram for the customized vending machine 10 starts with an attractor mode 20 where the screen on the vending machine displays colorful animation of the product to be purchased, in this case a customized bear. The consumer is then guided by visual and vocal instructions to an initial options touchscreen location 22 to select an initial option for the type of bear the consumer may purchase. A multiplicity of bears is then visually displayed on the vending machine screen and the consumer then goes to the select bear touchscreen location 24 to select the specific bear that the consumer wishes to purchase. The consumer then goes to the naked bear location 26 on the touchscreen so that a naked bear corresponding to the bear selected by the consumer appears on the screen to be dressed in a customized way.

The consumer is then directed to a choose path location 28 to go to various further locations. The consumer is then directed to the theme shop location 30 where the bear selected by the consumer is displayed in various themes such as a toy theme, a sports theme, a baby theme, an actor theme etc. The consumer is then directed to the display theme plaques 32 where one or more of the themes are concurrently and/or sequentially displayed so the consumer can select the specific theme desired. The consumer is then directed to the chosen theme location 34 where the consumer selects the specific theme for the bear.

The consumer is then directed to the upsell location 36 where the consumer is given choices on how to dress the bear. One upsell location is to dress the bear in a top garment and a bottom garment. The consumer may then choose to go to the top/bottom shop location 38 to choose the various garments in which to dress the bear. The consumer then goes to the display top location 40 where various tops such as a sweater, shirt, vest, coat, etc. are displayed on the screen, both individually and pictured on the bear so the consumer can see each specific top as it will ultimately appear on the bear. After the consumer decides which one or more tops the consumer wishes to purchase, the consumer is directed to the choose top location 42 to make the selection or selections.

The consumer is then directed to the display bottom location 44 where various bottoms such as pants, shorts, skirts, dresses, etc. are displayed on the screen, both individually and pictured on the bears. The consumer can see each specific top as it will ultimately appear on the bear. After the consumer decides which one or more bottoms the consumer wishes to purchase, the consumer is directed to the choose bottom location 46 to make the selection or selections. The displays are interconnected so the consumer can also view a selected top and a selected bottom on a bear with various mix and match combinations so the consumer can determine which combination of top and bottom it desires.

The consumer then goes back to the go to upsell location 36 and is directed to the upsell location 48 and thereafter the consumer is directed to the display item location 50 where the various upsell items are displayed. Upsell items include various accessories such as glasses, hats, pocket books, belts, ties, socks, shoes, jewelry (necklaces, earrings, etc.) in which to accessorize and dress the bear. The screen also displays the various accessory items on the bear in any combination desired by the consumer and also displays the upsell accessory items in conjunction with various combinations of tops and bottoms selected by the consumer.

The consumer is then directed to the display prices location 52 so that the price of each bear, top, bottom and upsell accessory is displayed. Each selected location also has prompts so the consumer can go to the display prices location to determine the price of a top, bottom or upsell accessory while the consumer is at the specific location viewing the top, bottom or upsell accessory either individually or displayed on the bear.

The consumer is then directed to the select items location 54 where the consumer makes a final choice as to which bear or bears, top or tops, bottom or bottoms, and various upsell accessory items the consumer wishes to purchase and thereafter, the consumer is directed to the checkout location 56 where various prompts instruct the consumer to select a bear only 58, an outfit only 60, an outfit and upsell 62, an upsell only 64, a bear and outfit 66 or a bear and outfit and upsell 68. The consumer is then shown the price of the total items selected and through prompts inserts either cash or a credit card in selected acceptance locations in the vending machine 10 and thereafter, the selected items are individually discharged from the vending machine at selected locations such as one or more chutes or slots or display drawers.

To enable the consumer to have fun with the bear and to induce the consumer to return, through various prompts the consumer is directed to the adventure mode location 70 where the consumer can play a game 1 72 or a game 2 74 with the selected bear either naked, partially dressed or fully dressed. In this way the consumer, especially children, become fascinated with the vending machine and will return in the future to purchase another bear, and/or another top or bottom, and/or an upsell accessory.

Figure 2:
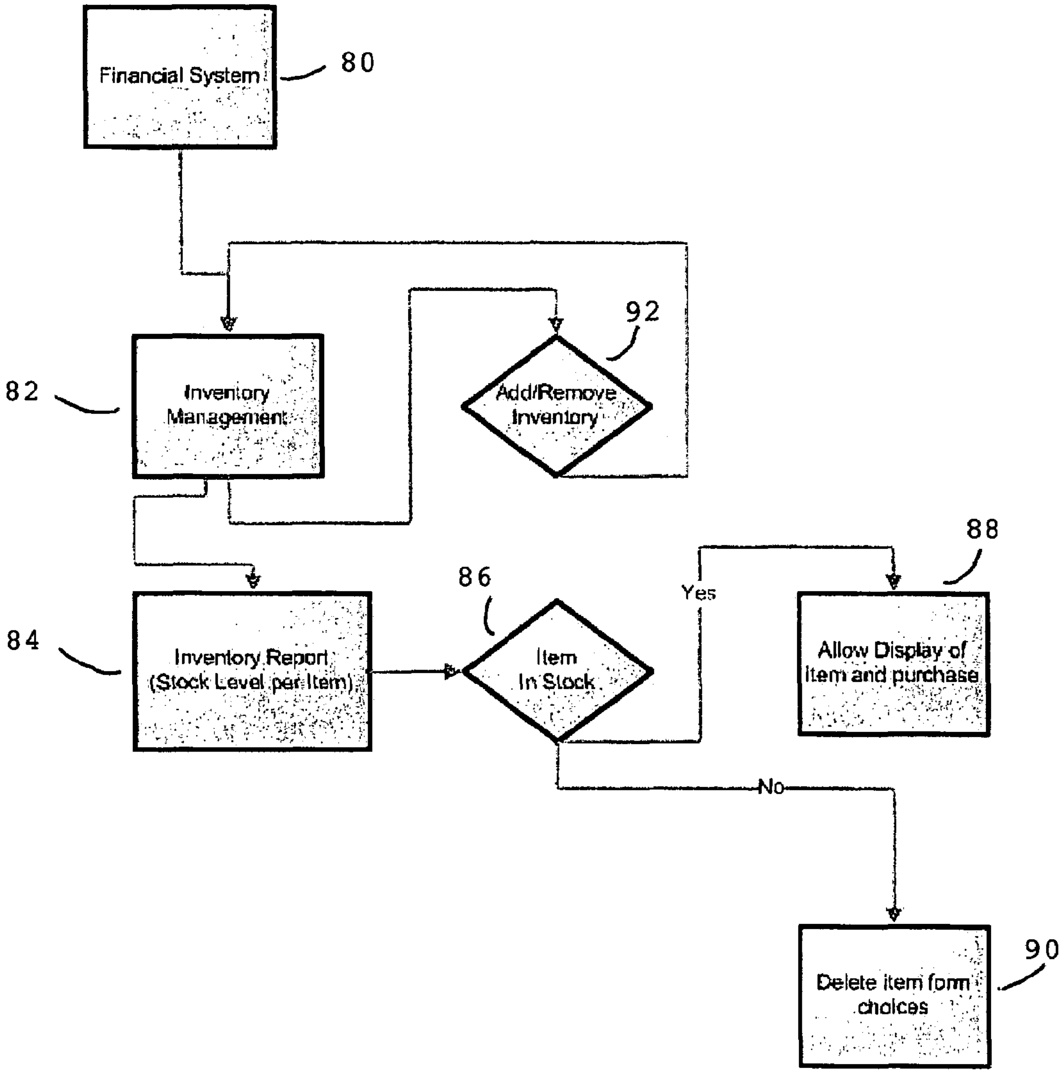
FIG. 2 is a block diagram of the internal inventory monitoring system of the interactive vending machine for the customized bear.

Referring to FIG. 2, another unique feature of the present invention is that the vending machine 10 keeps a continuous inventory run through its financial system 80. As items are displayed and purchased, the financial system 80 records an internal inventory management 82 which generates an internal inventory report 84 which tells the vending machine 10 if the item is in stock at the item in stock location 86. If the item (bear, top, bottom, upsell accessory) is in stock, it generates a yes command to allow display of the item at purchase command 88. If the item in stock location 86 shows that the specific item has been sold out, it generates a no command so that the instruction goes to delete item from choices command 90 so the item is deleted from the screen so the consumer cannot purchase it.

The Inventory Management Program 82 also generates and add/remove inventory report 92 to remove obsolete items from the display and to tell the owner to add items which have been sold out so that they can once again be displayed on the screen for sale.

The inventory system includes an item code, an item description, an SKU format, a sell price, a picture of the item and a second sample if needed. The stock management includes a spiral type, a spiral location, the number of items per spiral, an overflow, spiral option, the current stock level and a maximum stock level.

Through use of the present invention, a consumer, especially a child, is attracted to the visual and auditory effects of the interactive vending machine so that selected items such as a bear can be chosen and accessorized and customized with various tops, bottoms, and upsell accessory items being unique features so that the consumer can see how each item will look before it is purchased and see each item in a mix and match sequence so the consumer can decide which bear and which combination of top, bottom and upsell accessory attract the consumer most before a purchase is made. The adventure and game modes enable the consumer to play a game with the bear on the screen so that the consumer will be encouraged to return to play more games and make subsequent purchases.

Figure 3:
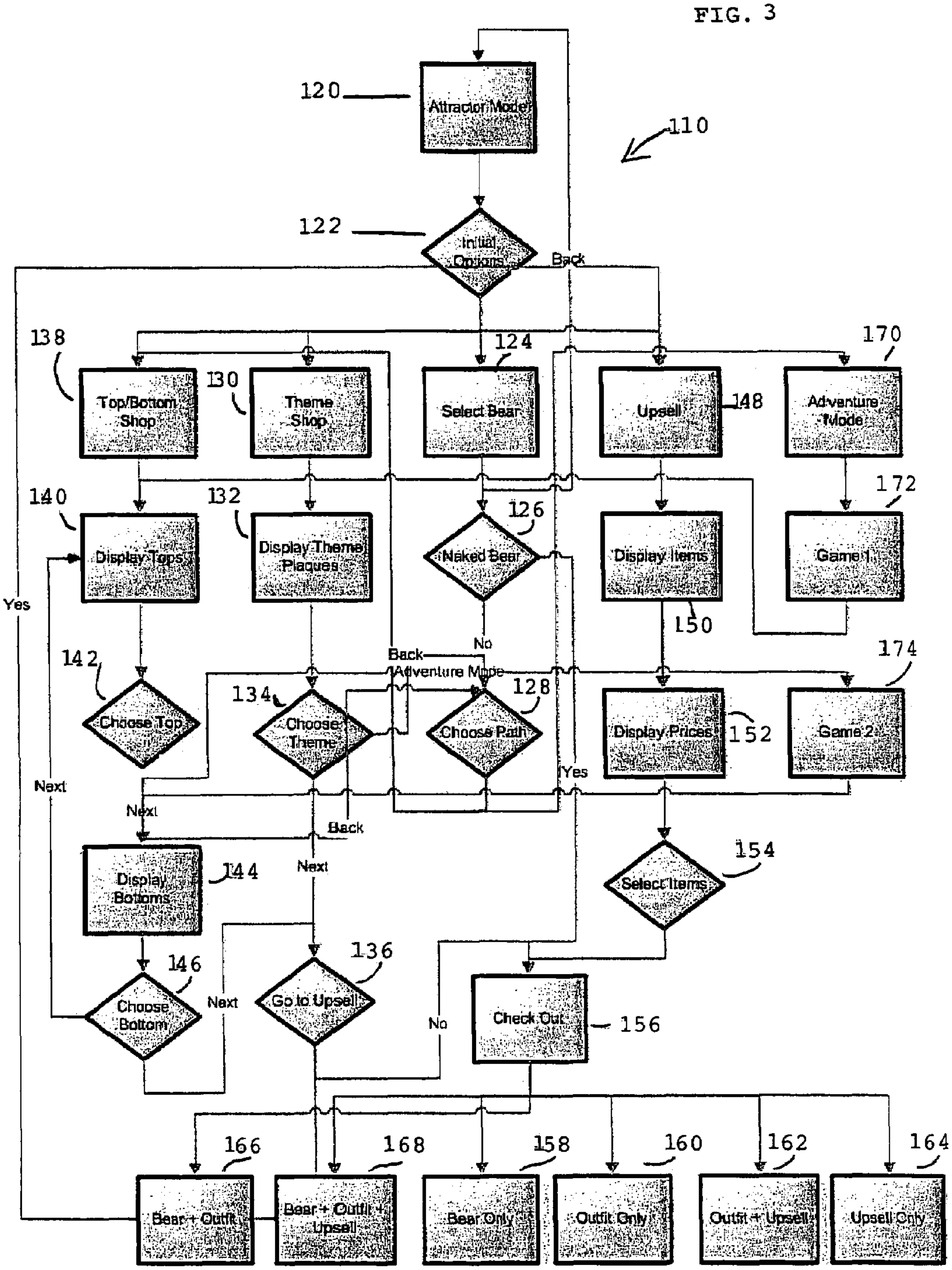
FIG. 3 is a block diagram showing the features of the interactive vending machine used to purchase a customized toy.
Figure 4:
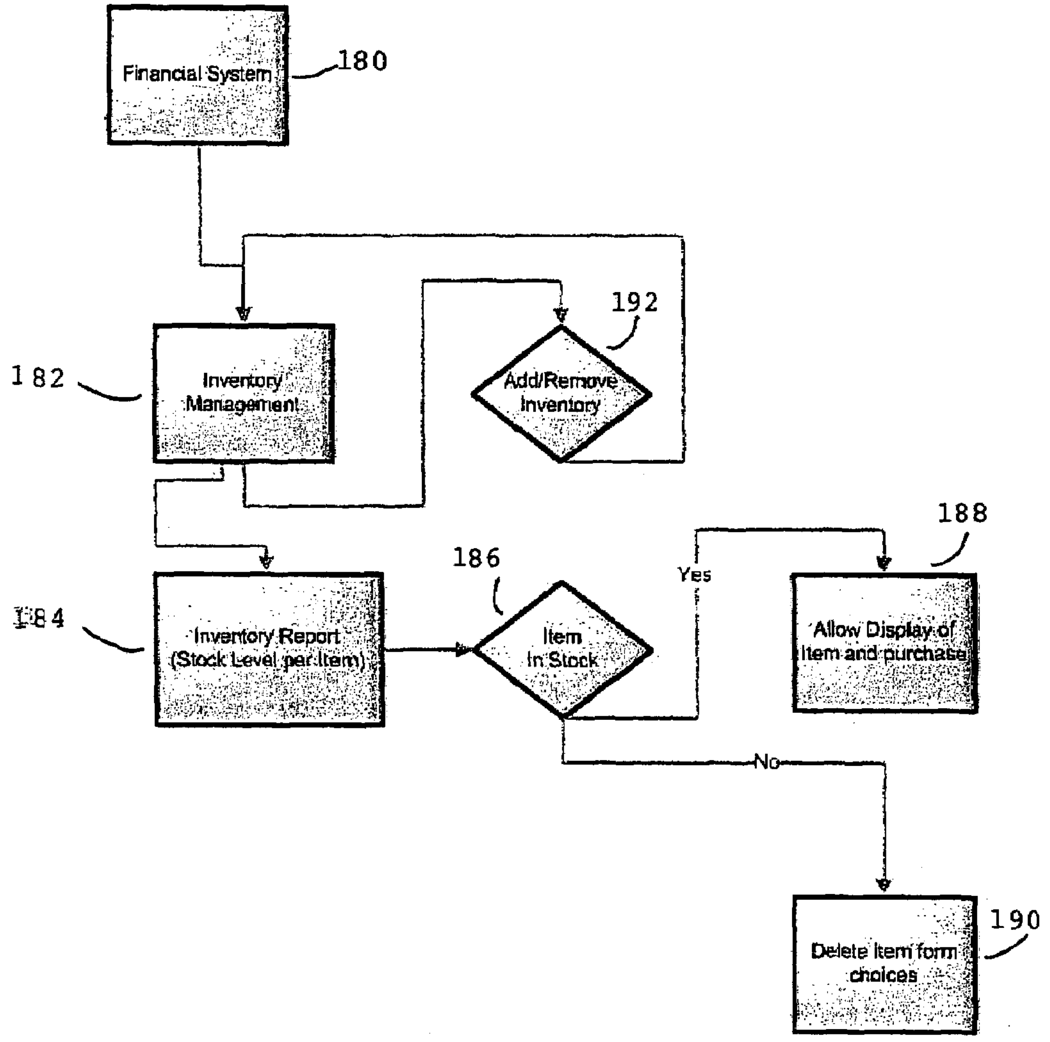
FIG. 4 is a block diagram of the internal inventory monitoring system of the interactive vending machine for the customized toy.

The present invention has been described in great detail with respect to a bear. It will be appreciated that the present invention can also be incorporated into any other type of toy wherein a selection for a wearing apparel or accessory item can be made. By way of example, in addition to a bear, there are numerous other stuffed plush toy animals including, but not limited to, cats, dogs, pandas, various types of farm animals such as cows, ducks, sheep, goats, pigs, etc., various types of wild animals such as monkeys, lions, tigers, elephants, giraffes, leopards, cheetahs, cougars, and various types of reptiles including alligators, turtles, lizards, frogs and various types of fish and shellfish such as lobsters and other types of shell fish and of course, dolls can be made, not only of fabric, but also made of plastic and numerous other materials as well as straw dolls. All of these numerous types of animals and regular dolls are hereafter defined as “toys”. Referring to FIGS. 3 and 4, there is listed a flowchart comparable to FIGS. 1 and 2 but dealing with toys and not just bears. Toys are defined as all of the above including any other type of product which a consumer, and especially a child, may purchase and dress with various types of garments and accessories.

Referring to FIG. 3, there is illustrated a block diagram showing the steps to select a customized product which in the example illustrated is a customized stuffed plush toy toy which will be dressed in a customized outfit selected by the customer.

The block diagram for the customized vending machine 110 starts with an attractor mode 120 where the screen on the vending machine displays colorful animation of the product to be purchased, in this case a customized toy. The consumer is then guided by visual and vocal instructions to an initial options touchscreen location 122 to select an initial option for the type of toy the consumer may purchase. A multiplicity of toys is then visually displayed on the vending machine screen and the consumer then goes to the select toy touchscreen location 124 to select the specific toy that the consumer wishes to purchase. The consumer then goes to the naked toy location 26 on the touchscreen so that a naked toy corresponding to the toy selected by the consumer appears on the screen to be dressed in a customized way.

The consumer is then directed to a choose path location 128 to go to various further locations. The consumer is then directed to the theme shop location 130 where the toy selected by the consumer is displayed in various themes such as a toy theme, a sports theme, a baby theme, an actor theme etc. The consumer is then directed to the display theme plaques 132 where one or more of the themes are concurrently and/or sequentially displayed so the consumer can select the specific theme desired. The consumer is then directed to the chosen theme location 134 where the consumer selects the specific theme for the toy.

The consumer is then directed to the upsell location 136 where the consumer is given choices on how to dress the toy. One upsell location is to dress the toy in a top garment and a bottom garment. The consumer may then choose to go to the top/bottom shop location 138 to choose the various garments in which to dress the toy. The consumer then goes to the display top location 140 where various tops such as a sweater, shirt, vest, coat, etc. are displayed on the screen, both individually and pictured on the toy so the consumer can see each specific top as it will ultimately appear on the toy. After the consumer decides which one or more tops the consumer wishes to purchase, the consumer is directed to the choose top location 142 to make the selection or selections.

The consumer is then directed to the display bottom location 144 where various bottoms such as pants, shorts, skirts, dresses, etc. are displayed on the screen, both individually and pictured on the toys. The consumer can see each specific top as it will ultimately appear on the toy. After the consumer decides which one or more bottoms the consumer wishes to purchase, the consumer is directed to the choose bottom location 146 to make the selection or selections. The displays are interconnected so the consumer can also view a selected top and a selected bottom on a toy with various mix and match combinations so the consumer can determine which combination of top and bottom it desires.

The consumer then goes back to the go to upsell location 136 and is directed to the upsell location 148 and thereafter the consumer is directed to the display item location 150 where the various upsell items are displayed. Upsell items include various accessories such as glasses, hats, pocket books, belts, ties, socks, shoes, jewelry (necklaces, earrings, etc.) in which to accessorize and dress the toy. The screen also displays the various accessory items on the toy in any combination desired by the consumer and also displays the upsell accessory items in conjunction with various combinations of tops and bottoms selected by the consumer.

The consumer is then directed to the display prices location 152 so that the price of each toy, top, bottom and upsell accessory is displayed. Each selected location also has prompts so the consumer can go to the display prices location to determine the price of a top, bottom or upsell accessory while the consumer is at the specific location viewing the top, bottom or upsell accessory either individually or displayed on the toy.

The consumer is then directed to the select items location 154 where the consumer makes a final choice as to which toy or toys, top or tops, bottom or bottoms, and various upsell accessory items the consumer wishes to purchase and thereafter, the consumer is directed to the checkout location 156 where various prompts instruct the consumer to select a toy only 158, an outfit only 160, an outfit and upsell 162, an upsell only 164, a toy and outfit 166 or a toy and outfit and upsell 168. The consumer is then shown the price of the total items selected and through prompts inserts either cash or a credit card in selected acceptance locations in the vending machine 110 and thereafter, the selected items are individually discharged from the vending machine at selected locations such as one or more chutes or slots or display drawers.

To enable the consumer to have fun with the toy and to induce the consumer to return, through various prompts the consumer is directed to the adventure mode location 170 where the consumer can play a game 1 172 or a game 2 174 with the selected toy either naked, partially dressed or fully dressed. In this way the consumer, especially children, become fascinated with the vending machine and will return in the future to purchase another toy, and/or another top or bottom, and/or an upsell accessory.

Referring to FIG. 4, another unique feature of the present invention is that the vending machine 110 keeps a continuous inventory run through its financial system 180. As items are displayed and purchased, the financial system 180 records an internal inventory management 182 which generates an internal inventory report 184 which tells the vending machine 110 if the item is in stock at the item in stock location 186. If the item (toy, top, bottom, upsell accessory) is in stock, it generates a yes command to allow display of the item at purchase command 188. If the item in stock location 186 shows that the specific item has been sold out, it generates a no command so that the instruction goes to delete item from choices command 190 so the item is deleted from the screen so the consumer cannot purchase it.

The Inventory Management Program 182 also generates and add/remove inventory report 192 to remove obsolete items from the display and to tell the owner to add items which have been sold out so that they can once again be displayed on the screen for sale.

The inventory system includes an item code, an item description, an SKU format, a sell price, a picture of the item and a second sample if needed. The stock management includes a spiral type, a spiral location, the number of items per spiral, an overflow, spiral option, the current stock level and a maximum stock level.

Through use of the present invention, a consumer, especially a child, is attracted to the visual and auditory effects of the interactive vending machine so that selected items such as a toy can be chosen and accessorized and customized with various tops, bottoms, and upsell accessory items being unique features so that the consumer can see how each item will look before it is purchased and see each item in a mix and match sequence so the consumer can decide which toy and which combination of top, bottom and upsell accessory attract the consumer most before a purchase is made. The adventure and game modes enable the consumer to play a game with the toy on the screen so that the consumer will be encouraged to return to play more games and make subsequent purchases.

Defined in detail for a customized bear, the present invention is an interactive vending machine having a screen to enable a consumer to purchase a stuffed plush bear and/or other item, comprising: (a) an attractor mode location where an animation of the bear is displayed on the screen; (b) an initial options location to enable the consumer to select an initial option for the type of bear desired; (c) a select bear location where the consumer can select a desired bear from a multiplicity of bears displayed on the screen; (d) a naked bear location where the bear selected by the consumer appears in animated form and is naked; (e) a choose path location where the consumer selects various display items locations to go to; (f) a theme shop location where the bear selected by the consumer is displayed in various themes; (g) a chosen theme location where the consumer is able to select a specific theme for the selected bear; (h) a top/bottom shop location where various garments in which to dress the selected bear are listed; (i) a display tops location where various garment tops are displayed on the screen; (j) a choose top location where the consumer selects one or more tops in which to dress the selected bear; (k) a display bottoms location where various garment bottoms are displayed on the screen; (l) a choose bottom location where the consumer selects one or more bottoms in which to dress the selected bear; (m) an upsell location where various upsell accessories to embellish the selected bear are listed; (n) a display upsell items location where the various upsell accessories are displayed on screen; (o) a display prices location where the price of the various bears, tops, bottoms and upsell accessories items is displayed; (p) a select items location where the consumer makes a final choice as to which bear, top or tops, bottom or bottoms and various upsell accessory items the consumer wishes to purchase; (q) a checkout location where various prompts instruct the consumer to select a bear only location, an outfit top and/or bottom location, an outfit top and/or bottom and upsell accessory location, an upsell accessory only location, a bear plus outfit top and/or bottom location, and a bear plus outfit top and/or bottom plus upsell accessory location so the consumer can select which combination the consumer wishes to purchase; (r) means whereby the consumer can visually see each specific item at a specific location and see a visual representation of a selected bear combined with one or more tops, bottoms, and upsell accessories so the consumer can see an animation on screen which displays a completed bear wearing each selected item; (s) means to enable the consumer to pay for the selected bear and selected items; and (t) means to dispense the selected bear and selected items from the vending machine.

Defined more broadly for a customized bear, the present invention is an interactive vending machine having a screen to enable a consumer to purchase a bear and/or other item, comprising: (a) screen locations depicting pictures of a selection of bears for the consumer to choose and providing means to enable the consumer to choose at least one bear for purchase; (b) screen locations depicting garments which may be worn by the bear and means to depict the bear wearing any combination of garments to enable the consumer to see how the bear will look with any selected combination of garments; (c) screen locations depicting upsell accessory items which may be worn by the bear and means to depict the bear wearing any one or combination of accessory items with or without any combination of garments to enable the consumer to see how the bear will look with any selected combination of upsell accessory items; (d) screen locations which set forth the prices of each bear, garment and accessory items and screen locations to enable a consumer to select the specific items the consumer wishes to purchase; (e) means to enable the consumer to pay for the selected item; and (f) means to dispense each of the items selected by the consumer from the vending machine.

Defined even more broadly for a customized bear, the present invention is an interactive vending machine having a screen to enable a consumer to purchase a bear and/or other item, comprising: (a) a multiplicity of screen locations to which a consumer can go depicting a multiplicity of bears with means to enable the consumer to select at least one bear, the screen locations including a multiplicity of screens depicting garments to be worn by the bear and upsell accessory items to be worn by a bear, and means to visually display at given locations how a bear will appear with any one or more selected wearing accessories so that a consumer can interact with the vending machine to view any combination of bear and accessory items so that the consumer can see how the bear and items to be purchase will appear before a purchase is made; (b) screen locations setting forth the prices of each bear and additional items and means to enable a consumer to select specific items the consumer wishes to purchase; (c) means to enable the consumer to pay for the selected items; and (d) means to dispense each item selected by the consumer from the vending machine.

Defined most broadly for a customized bear, the present invention is an interactive vending machine having a screen to enable a consumer to purchase a bear and/or other item, comprising: (a) a multiplicity of screen locations to which the consumer can go depicting at least one bear and at least one wearing item to be worn by the bear so that the consumer can see a visual representation on the screen as to how the at least one bear will appear with the at least one item before the consumer makes a purchase; (b) at least one screen location setting forth the prices of the at least one bear and at least one wearing item and means to enable the consumer to select chosen items; (c) means to enable the consumer to pay for the selected items; and (d) means to dispense each item selected by the consumer from the vending machine.

Defined in detail for any customized toy, the present invention is an interactive vending machine having a screen to enable a consumer to purchase a toy and/or other item, comprising: (a) an attractor mode location where an animation of the toy is displayed on the screen; (b) an initial options location to enable the consumer to select an initial option for the type of toy desired; (c) a select toy location where the consumer can select a desired toy from a multiplicity of toys displayed on the screen; (d) a naked toy location where the toy selected by the consumer appears in animated form and is naked; (e) a choose path location where the consumer selects various display items locations to go to; (f) a theme shop location where the toy selected by the consumer is displayed in various themes; (g) a chosen theme location where the consumer is able to select a specific theme for the selected toy; (h) a top/bottom shop location where various garments in which to dress the selected toy are listed; (i) a display tops location where various garment tops are displayed on the screen; (j) a choose top location where the consumer selects one or more tops in which to dress the selected toy; (k) a display bottoms location where various garment bottoms are displayed on the screen; (l) a choose bottom location where the consumer selects one or more bottoms in which to dress the selected toy; (m) an upsell location where various upsell accessories to embellish the selected toy are listed; (n) a display upsell items location where the various upsell accessories are displayed on screen; (o) a display prices location where the price of the various toys, tops, bottoms and upsell accessories items is displayed; (p) a select items location where the consumer makes a final choice as to which toy, top or tops, bottom or bottoms and various upsell accessory items the consumer wishes to purchase; (q) a checkout location where various prompts instruct the consumer to select a toy only location, an outfit top and/or bottom location, an outfit top and/or bottom and upsell accessory location, an upsell accessory only location, a toy plus outfit top and/or bottom location, and a toy plus outfit top and/or bottom plus upsell accessory location so the consumer can select which combination the consumer wishes to purchase; (r) means whereby the consumer can visually see each specific item at a specific location and see a visual representation of a selected toy combined with one or more tops, bottoms, and upsell accessories so the consumer can see an animation on screen which displays a completed toy wearing each selected item; (s) means to enable the consumer to pay for the selected toy and selected items; and (t) means to dispense the selected toy and selected items from the vending machine.

Defined more broadly for any customized toy, the present invention is an interactive vending machine having a screen to enable a consumer to purchase a toy and/or other item, comprising: (a) screen locations depicting pictures of a selection of toys for the consumer to choose and providing means to enable the consumer to choose at least one toy for purchase; (b) screen locations depicting garments which may be worn by the toy and means to depict the toy wearing any combination of garments to enable the consumer to see how the toy will look with any selected combination of garments; (c) screen locations depicting upsell accessory items which may be worn by the toy and means to depict the toy wearing any one or combination of accessory items with or without any combination of garments to enable the consumer to see how the toy will look with any selected combination of upsell accessory items; (d) screen locations which set forth the prices of each toy, garment and accessory items and screen locations to enable a consumer to select the specific items the consumer wishes to purchase; (e) means to enable the consumer to pay for the selected item; and (f) means to dispense each of the items selected by the consumer from the vending machine.

Defined even more broadly for any customized toy, the present invention is an interactive vending machine having a screen to enable a consumer to purchase a toy and/or other item, comprising: (a) a multiplicity of screen locations to which a consumer can go depicting a multiplicity of toys with means to enable the consumer to select at least one toy, the screen locations including a multiplicity of screens depicting garments to be worn by the toy and upsell accessory items to be worn by a toy, and means to visually display at given locations how a toy will appear with any one or more selected wearing accessories so that a consumer can interact with the vending machine to view any combination of toy and accessory items so that the consumer can see how the toy and items to be purchase will appear before a purchase is made; (b) screen locations setting forth the prices of each toy and additional items and means to enable a consumer to select specific items the consumer wishes to purchase; (c) means to enable the consumer to pay for the selected items; and (d) means to dispense each item selected by the consumer from the vending machine.

Defined most broadly for any customized toy, the present invention is an interactive vending machine having a screen to enable a consumer to purchase a toy and/or other item, comprising: (a) a multiplicity of screen locations to which the consumer can go depicting at least one toy and at least one wearing item to be worn by the toy so that the consumer can see a visual representation on the screen as to how the at least one toy will appear with the at least one item before the consumer makes a purchase; (b) at least one screen location setting forth the prices of the at least one toy and at least one wearing item and means to enable the consumer to select chosen items; (c) means to enable the consumer to pay for the selected items; and (d) means to dispense each item selected by the consumer from the vending machine.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An interactive vending machine having a screen to enable a consumer to purchase a stuffed plush bear and/or other item, comprising:

a. an attractor mode location where an animation of the bear is displayed on the screen;
b. an initial options location to enable the consumer to select an initial option for the type of bear desired;
c. a select bear location where the consumer can select a desired bear from a multiplicity of bears displayed on the screen;
d. a naked bear location where the bear selected by the consumer appears in animated form and is naked;
e. a choose path location where the consumer selects various display items locations to go to;
f. a theme shop location where the bear selected by the consumer is displayed in various themes;
g. a chosen theme location where the consumer is able to select a specific theme for the selected bear;
h. a top/bottom shop location where various garments in which to dress the selected bear are listed;
i. a display tops location where various garment tops are displayed on the screen;
j. a choose top location where the consumer selects one or more tops in which to dress the selected bear;
k. a display bottoms location where various garment bottoms are displayed on the screen;
l. a choose bottom location where the consumer selects one or more bottoms in which to dress the selected bear;
m. an upsell location where various upsell accessories to embellish the selected bear are listed;
n. a display upsell items location where the various upsell accessories are displayed on screen;
o. a display prices location where the price of the various bears, tops, bottoms and upsell accessories items is displayed;
p. a select items location where the consumer makes a final choice as to which bear, top or tops, bottom or bottoms and various upsell accessory items the consumer wishes to purchase;
q. a checkout location where various prompts instruct the consumer to select a bear only location, an outfit top and/or bottom location, an outfit top and/or bottom and upsell accessory location, an upsell accessory only location, a bear plus outfit top and/or bottom location, and a bear plus outfit top and/or bottom plus upsell accessory location so the consumer can select which combination the consumer wishes to purchase;
r. means whereby the consumer can visually see each specific item at a specific location and see a visual representation of a selected bear combined with one or more tops, bottoms, and upsell accessories so the consumer can see an animation on screen which displays a completed bear wearing each selected item;
s. means to enable the consumer to pay for the selected bear and selected items; and
t. means to dispense the selected bear and selected items from the vending machine.

2. An interactive vending machine in accordance with claim 1, wherein each location further comprises a touch screen enabling the consumer to make a selection of a bear or a wearing item for the bear.

3. An interactive vending machine in accordance with claim 1, wherein each location further comprises a visual animation and an audio of the bear or items displayed at the location.

4. An interactive vending machine in accordance with claim 1, further comprising an inventory management system which keeps track of each bear and other items displayed for sale through the interactive vending machine and if a given bear or other item is out of stock, generates a command to remove the given bear or other item from the display screen selection so that an out of stock bear or item cannot be displayed.

5. An interactive vending machine in accordance with claim 1, further comprising screen locations to enable the consumer to play at least one game with the selected bear.

6. An interactive vending machine having a screen to enable a consumer to purchase a bear and/or other item, comprising:

a. screen locations depicting pictures of a selection of bears for the consumer to choose and providing means to enable the consumer to choose at least one bear for purchase;
b. screen locations depicting garments which may be worn by the bear and means to depict the bear wearing any combination of garments to enable the consumer to see how the bear will look with any selected combination of garments;
c. screen locations depicting upsell accessory items which may be worn by the bear and means to depict the bear wearing any one or combination of accessory items with or without any combination of garments to enable the consumer to see how the bear will look with any selected combination of upsell accessory items;

d. screen locations which set forth the prices of each bear, garment and accessory items and screen locations to enable a consumer to select the specific items the consumer wishes to purchase;

e. means to enable the consumer to pay for the selected item; and f. means to dispense each of the items selected by the consumer from the vending machine.

7. An interactive vending machine in accordance with claim 6, wherein each location further comprises a touch screen enabling the consumer to make a selection of a bear or a wearing item for the bear.

8. An interactive vending machine in accordance with claim 6, wherein each location further comprises a visual animation and an audio of the bear or items displayed at the location.

9. An interactive vending machine in accordance with claim 6, further comprising an inventory management system which keeps track of each bear and other item displayed for sale through the interactive vending machine and if a given bear or other item is out of stock, generates a command to remove the given bear or other item from the display screen selection so that an out of stock bear or item cannot be displayed.

10. An interactive vending machine in accordance with claim 6, further comprising screen locations to enable the consumer to play at least one game with the selected bear.

11. An interactive vending machine having a screen to enable a consumer to purchase a bear and/or other item, comprising:

a. a multiplicity of screen locations to which a consumer can go depicting a multiplicity of bears with means to enable the consumer to select at least one bear, the screen locations including a multiplicity of screens depicting garments to be worn by the bear and upsell accessory items to be worn by a bear, and means to visually display at given locations how a bear will appear with any one or more selected wearing accessories so that a consumer can interact with the vending machine to view any combination of bear and accessory items so that the consumer can see how the bear and items to be purchase will appear before a purchase is made;

b. screen locations setting forth the prices of each bear and additional items and means to enable a consumer to select specific items the consumer wishes to purchase;

c. means to enable the consumer to pay for the selected items; and d. means to dispense each item selected by the consumer from the vending machine.

12. An interactive vending machine in accordance with claim 11, wherein each location further comprises a touch screen enabling the consumer to make a selection of a bear or a wearing item for the bear.

13. An interactive vending machine in accordance with claim 11, wherein each location further comprises a visual animation and an audio of the bear or items displayed at the location.

14. An interactive vending machine in accordance with claim 11, further comprising an inventory management system which keeps track of each bear and other items displayed for sale through the interactive vending machine and if a given bear or other item is out of stock, generates a command to remove the given bear or other item from the display screen selection so that an out of stock bear or item cannot be displayed.

15. An interactive vending machine in accordance with claim 11, further comprising screen locations to enable the consumer to play at least one game with the selected bear.

16. An interactive vending machine having a screen to enable a consumer to purchase a bear and/or other item, comprising:

a. a multiplicity of screen locations to which the consumer can go depicting at least one bear and at least one wearing item to be worn by the bear so that the consumer can see a visual representation on the screen as to how the at least one bear will appear with the at least one item before the consumer makes a purchase;

b. at least one screen location setting forth the prices of the at least one bear and at least one wearing item and means to enable the consumer to select chosen items;

c. means to enable the consumer to pay for the selected items; and d. means to dispense each item selected by the consumer from the vending machine.

17. An interactive vending machine in accordance with claim 16, wherein each location further comprises a touch screen enabling the consumer to make a selection of a bear or a wearing item for the bear.

18. An interactive vending machine in accordance with claim 16, wherein each location further comprises a visual animation and an audio of the at least one bear or at least one item displayed at the location.

19. An interactive vending machine in accordance with claim 16, further comprising an inventory management system which keeps track of each bear and other items displayed for sale through the interactive vending machine and if a given bear or other item is out of stock, generates a command to remove the given bear or other item from the display screen selection so that an out of stock bear or item cannot be displayed.

20. An interactive vending machine in accordance with claim 16, further comprising screen locations to enable the consumer to play at least one game with the at least one bear.

21. An interactive vending machine having a screen to enable a consumer to purchase a toy and/or other item, comprising:

a. an attractor mode location where an animation of the toy is displayed on the screen;

b. an initial options location to enable the consumer to select an initial option for the type of toy desired;

c. a select toy location where the consumer can select a desired toy from a multiplicity of toys displayed on the screen;

d. a naked toy location where the toy selected by the consumer appears in animated form and is naked;

e. a choose path location where the consumer selects various display items locations to go to;

f. a theme shop location where the toy selected by the consumer is displayed in various themes;

g. a chosen theme location where the consumer is able to select a specific theme for the selected toy;

h. a top/bottom shop location where various garments in which to dress the selected toy are listed;

i. a display tops location where various garment tops are displayed on the screen;

j. a choose top location where the consumer selects one or more tops in which to dress the selected toy;

k. a display bottoms location where various garment bottoms are displayed on the screen;

l. a choose bottom location where the consumer selects one or more bottoms in which to dress the selected toy;

m. an upsell location where various upsell accessories to embellish the selected toy are listed;

n. a display upsell items location where the various upsell accessories are displayed on screen;

o. a display prices location where the price of the various toys, tops, bottoms and upsell accessories items is displayed;

p. a select items location where the consumer makes a final choice as to which toy, top or tops, bottom or bottoms and various upsell accessory items the consumer wishes to purchase;

q. a checkout location where various prompts instruct the consumer to select a toy only location, an outfit top and/or bottom location, an outfit top and/or bottom and upsell accessory location, an upsell accessory only location, a toy plus outfit top and/or bottom location, and a toy plus outfit top and/or bottom plus upsell accessory location so the consumer can select which combination the consumer wishes to purchase;

r. means whereby the consumer can visually see each specific item at a specific location and see a visual representation of a selected toy combined with one or more tops, bottoms, and upsell accessories so the consumer can see an animation on screen which displays a completed toy wearing each selected item;

s. means to enable the consumer to pay for the selected toy and selected items; and t. means to dispense the selected toy and selected items from the vending machine.

22. An interactive vending machine in accordance with claim 21, wherein each location further comprises a touch screen enabling the consumer to make a selection of a toy or a wearing item for the toy.

23. An interactive vending machine in accordance with claim 21, wherein each location further comprises a visual animation and an audio of the toy or items displayed at the location.

24. An interactive vending machine in accordance with claim 21, further comprising an inventory management system which keeps track of each toy and other items displayed for sale through the interactive vending machine and if a given toy or other item is out of stock, generates a command to remove the given toy or other item from the display screen selection so that an out of stock toy or item cannot be displayed.

25. An interactive vending machine in accordance with claim 21, further comprising screen locations to enable the consumer to play at least one game with the selected toy.

26. An interactive vending machine having a screen to enable a consumer to purchase a toy and/or other item, comprising:

a. screen locations depicting pictures of a selection of toys for the consumer to choose and providing means to enable the consumer to choose at least one toy for purchase;

b. screen locations depicting garments which may be worn by the toy and means to depict the toy wearing any combination of garments to enable the consumer to see how the toy will look with any selected combination of garments;

c. screen locations depicting upsell accessory items which may be worn by the toy and means to depict the toy wearing any one or combination of accessory items with or without any combination of garments to enable the consumer to see how the toy will look with any selected combination of upsell accessory items;

d. screen locations which set forth the prices of each toy, garment and accessory items and screen locations to enable a consumer to select the specific items the consumer wishes to purchase;

e. means to enable the consumer to pay for the selected item; and f. means to dispense each of the items selected by the consumer from the vending machine.

27. An interactive vending machine in accordance with claim 26, wherein each location further comprises a touch screen enabling the consumer to make a selection of a toy or a wearing item for the toy.

28. An interactive vending machine in accordance with claim 26, wherein each location further comprises a visual animation and an audio of the toy or items displayed at the location.

29. An interactive vending machine in accordance with claim 26, further comprising an inventory management system which keeps track of each toy and other item displayed for sale through the interactive vending machine and if a given toy or other item is out of stock, generates a command to remove the given toy or other item from the display screen selection so that an out of stock toy or item cannot be displayed.

30. An interactive vending machine in accordance with claim 26, further comprising screen locations to enable the consumer to play at least one game with the selected toy.

31. An interactive vending machine having a screen to enable a consumer to purchase a toy and/or other item, comprising:

a. a multiplicity of screen locations to which a consumer can go depicting a multiplicity of toys with means to enable the consumer to select at least one toy, the screen locations including a multiplicity of screens depicting garments to be worn by the toy and upsell accessory items to be worn by a toy, and means to visually display at given locations how a toy will appear with any one or more selected wearing accessories so that a consumer can interact with the vending machine to view any combination of toy and accessory items so that the consumer can see how the toy and items to be purchase will appear before a purchase is made;

b. screen locations setting forth the prices of each toy and additional items and means to enable a consumer to select specific items the consumer wishes to purchase;

c. means to enable the consumer to pay for the selected items; and d. means to dispense each item selected by the consumer from the vending machine.

32. An interactive vending machine in accordance with claim 31, wherein each location further comprises a touch screen enabling the consumer to make a selection of a toy or a wearing item for the toy.

33. An interactive vending machine in accordance with claim 31, wherein each location further comprises a visual animation and an audio of the toy or items displayed at the location.

34. An interactive vending machine in accordance with claim 31, further comprising an inventory management system which keeps track of each toy and other items displayed for sale through the interactive vending machine and if a given toy or other item is out of stock, generates a command to remove the given toy or other item from the display screen selection so that an out of stock toy or item cannot be displayed.

35. An interactive vending machine in accordance with claim 31, further comprising screen locations to enable the consumer to play at least one game with the selected toy.

36. An interactive vending machine having a screen to enable a consumer to purchase a toy and/or other item, comprising:

a. a multiplicity of screen locations to which the consumer can go depicting at least one toy and at least one wearing item to be worn by the toy so that the consumer can see a visual representation on the screen as to how the at least one toy will appear with the at least one item before the consumer makes a purchase;

b. at least one screen location setting forth the prices of the at least one toy and at least one wearing item and means to enable the consumer to select chosen items;

c. means to enable the consumer to pay for the selected items; and d. means to dispense each item selected by the consumer from the vending machine.

37. An interactive vending machine in accordance with claim 36, wherein each location further comprises a touch screen enabling the consumer to make a selection of a toy or a wearing item for the toy.

38. An interactive vending machine in accordance with claim 36, wherein each location further comprises a visual animation and an audio of the toy or items displayed at the location.

39. An interactive vending machine in accordance with claim 36, further comprising an inventory management system which keeps track of each toy and other item displayed for sale through the interactive vending machine and if a given toy or other item is out of stock, generates a command to remove the given toy or other item from the display screen selection so that an out of stock toy or item cannot be displayed.

40. An interactive vending machine in accordance with claim 36, further comprising screen locations to enable the consumer to play at least one game with the selected toy.

* * * * *